United States Patent [19]
Barak

[11] Patent Number: 6,078,652
[45] Date of Patent: *Jun. 20, 2000

[54] LEAST COST ROUTING SYSTEM

[75] Inventor: Gideon Barak, Raanana, Israel

[73] Assignee: Call Manage, Ltd., Kfar Saba, Israel

[ * ] Notice: This patent is subject to a terminal disclaimer.

[21] Appl. No.: 08/993,496

[22] Filed: Dec. 18, 1997

Related U.S. Application Data

[63] Continuation of application No. 08/505,024, Jul. 21, 1995, Pat. No. 5,744,741.

[51] Int. Cl.[7] .................................................. H04M 15/00
[52] U.S. Cl. ............................................ 379/115; 379/221
[58] Field of Search .................. 379/112–115, 130–132, 379/221, 354, 355, 356

[56] References Cited

U.S. PATENT DOCUMENTS

| | | |
|---|---|---|
| 4,585,904 | 4/1986 | Mincone et al. . |
| 4,751,728 | 6/1988 | Treat . |
| 4,791,665 | 12/1988 | Bogart et al. . |
| 4,860,342 | 8/1989 | Danner . |
| 5,400,395 | 3/1995 | Berenato . |
| 5,420,914 | 5/1995 | Blumhardt . |
| 5,425,084 | 6/1995 | Brinskele . |
| 5,425,085 | 6/1995 | Weinberger et al. . |
| 5,455,858 | 10/1995 | Lin . |
| 5,515,425 | 5/1996 | Penzias et al. . |
| 5,519,769 | 5/1996 | Weinberger et al. . |
| 5,638,433 | 6/1997 | Bubien, Jr. et al. . |
| 5,668,955 | 9/1997 | deCiutiis et al. ........................ 379/130 |
| 5,878,121 | 3/1999 | Nakanishi ............... 379/115 |
| 5,881,139 | 3/1999 | Romines ................ 379/115 |

FOREIGN PATENT DOCUMENTS

34289/95  5/1996  Australia .

OTHER PUBLICATIONS

Jainschigg, J., "Think Globally, Act Locally Telegen's ACS 2000 Single–Line LCR Can Keep You Sane And Save You Money" Teleconnect pp. 32–33, May 1995.

*Primary Examiner*—Paul Loomis
*Attorney, Agent, or Firm*—Ohlandt, Greeley, Ruggiero & Perle, L.L.P.

[57] ABSTRACT

A least cost routing system is disclosed. The routing system includes at least one telephone dialing unit, at least one least cost router and a database updating unit. The telephone dialing unit dials a telephone number to place a telephone call. Each least cost router has a corresponding routing database of tariffs of telephone service providers and determines, from information in its corresponding routing database, which telephone service provider or providers to utilize to execute the telephone call. The database updating unit electronically updates tariff information into each of the routing databases shortly after updated tariff information is entered therein.

12 Claims, 5 Drawing Sheets

LEAST COST ROUTING SYSTEM

This application is a continuation of U.S. patent application Ser. No. 08/505,024, filed on Jul. 21, 1995, now U.S. Pat. No. 5,744,741.

FIELD OF THE INVENTION

The present invention relates to telephone communications and more specifically, to a method and system for selecting the least cost route for short and long distance telephone calls.

BACKGROUND OF THE INVENTION

The United States is divided into a plurality of contiguous, non-overlapping exchanges, referred to as Local Access Transport Areas (LATAs), each of which is served by a local telephone company. Telephone calls originating and terminating within the same exchange, referred to as intra-exchange calls, are handled end-to-end by a local, intra-exchange, telephone company. Calls originating within one exchange or in a foreign country and terminating in a different exchange or in a foreign country, referred to as inter-exchange calls, are handled at each end by the intra-exchange company that services the originating and the terminating exchanges. These inter-exchange calls are carried between the intra-exchange companies by one or more inter-exchange carriers.

A caller who wishes to select an inter-exchange carrier must dial special access codes that are assigned to each inter-exchange carrier and once connected, must also dial a personal identification code and the number of the called party to have the call completed. With the proliferation of inter-exchange carriers, carrier selection is often difficult for a telephone communication system user. The user may be unaware of which inter-exchange carrier is the most economical for a particular time of day, which inter-exchange carrier serves the user's telephone communication system or what access codes are appropriate for the particular inter-exchange carriers available to the user's telephone communication system.

During the last few years, the competition between telephone companies (also known as "operating companies" or "service providers") for the telephone subscribers business has increased markedly. This competition is most evident in the multiplicity of tariffs from each carrier, which vary not only between destinations but also vary according to the time of day and the length of call. Also competition exists between intra-exchange service providers.

Though this competition gives the customer an opportunity for significant money saving, the customer rarely benefits fully because of the complexity and the variety of tariffs. For example, tariffs may vary due to the time of day, on weekends, holidays, according to the call destination and method of payment. The situation may be further complicated by special limited discounts offered by the telephone companies, the entry of new telephone companies to new markets and the grade of service requested (such as voice quality and connection delays).

The entry of new money saving services, such as Fax Store and Forward and call-back services, the availability of alternate services offered by private networks using their own PBX and the usage of corporate networks are additional factors affecting the cost of the call. Consequently, the customer has to contend with a huge amount of information in order to make a simple telephone call.

U.S. Pat. No. 4,791,665 to Bogart et al. describes a telephone communication system (PBXs) with the capability of automatically selecting one of a plurality of inter-exchange carriers. The system includes a database containing access code data associated with the inter-exchange carriers, user authorization codes and information about the various inter-exchange carrier billing rates based on time of day and destination. The PBX scans the database and reroutes the originating call to one of the other inter-exchange carriers having a cheaper tariff for the particular destination at the specific time of day. The PBX sends out the inter-exchange carrier access code, the user's personal identification code and the called party number dialed by the user to complete the call.

U.S. Pat. No. 5,425,084 to Brinskele describes a computer controlled telephone communication system which includes a plurality of digital switches each located in different charge zones. Each digital switch is coupled to a file server which determines which of the digital switches to use in order to ensure the lowest possible cost for the call.

U.S. Pat. No. 5,420,914 to Blumhardt describes a real time selection of one of a plurality of inter-exchange carriers which automatically selects the carrier having the least expensive toll at the time the call is made and reroutes the call accordingly. Blumhardt is used in conjunction with an advanced intelligent network (AIN) in a public switched telephone network (PSTN).

In prior art least cost routing systems, updating the tariff database is very complicated since the interface to do so is cumbersome. Therefore, the operators of the least cost routing system rarely update their tariff databases. As a result, the routing decision taken may not necessarily be the optimum route for the call, at that time.

SUMMARY OF THE PRESENT INVENTION

It is an object of the present invention to provide a system and a method for selecting a telephone service provider for all telephone calls which overcomes the disadvantages of the prior art. It is a further object of the present invention to provide a data server for monitoring and updating changes in telephone service provider tariffs and a system for updating the routing information used by the least cost routers when selecting the optimum route for a call.

There is therefore provided, in accordance with a preferred embodiment of the present invention, a least cost routing system including at least one telephone dialing unit, at least one least cost router and a database updating unit. Each telephone dialing unit dials a telephone number to place a telephone call. East least cost router has a corresponding routing database of tariffs of telephone service providers and determines, from information in its corresponding routing database, which telephone service provider or providers to utilize to execute the telephone call. The database updating unit electronically updates tariff information into each of the routing databases shortly after updated tariff information is entered therein.

Moreover, in accordance with a preferred embodiment of the present invention, the database updating unit includes apparatus for directly connecting to the at least one least cost router. Alternatively, the database updating unit includes apparatus for providing the updated tariff information to a user who provides the updated tariff information to his least cost router.

Additionally, in accordance with a preferred embodiment of the present invention, the telephone service providers can be any of central switching offices, inter-exchange carriers, intra-exchange carriers, fax-store-and-forward providers, call-back providers.

Further, in accordance with a preferred embodiment of the present invention, the least cost router includes apparatus for generating call history information including length of a phone call, destination phone number, and service provider utilized. The least cost router utilizes the call history information to determine whether or not a volume discount rate applies to the requested phone call. It can also utilize the call history information to determine statistics of phone calls and, from the statistics, to generate expected call duration estimates.

Still further, in accordance with a preferred embodiment of the present invention, the telephone dialing unit is formed as part of any one of the following: a centrex exchange (CTX), a private branch exchange (PBX), a cellular telephone and a personal computer.

There is also provided, in accordance with a second preferred embodiment of the present invention, a personal computer based telephone dialing system. The system includes a user interface unit, a dialing unit, and a least cost router. The user interface unit indicates a telephone number to be called which the dialing unit dials. The least cost router operates as described hereinabove. Preferably, the least cost router is updated by a database updating unit as described hereinabove.

There is further provided, in accordance with a third preferred embodiment of the present invention, a least cost routing updating unit for updating a plurality of remote tariff databases storing therein tariffs of telephone service providers. The updating unit includes database apparatus for storing tariff information, apparatus for receiving changes to the tariff information thereby to create updated tariff information and apparatus for electronically updating tariff information into the plurality of remote tariff databases shortly after the updating tariff information is entered therein.

Additionally, in accordance with the third preferred embodiment of the present intention, the apparatus for electronically updating includes apparatus for emulating the interface of a remote tariff database thereby to update the remote tariff database. This can include apparatus for directly connecting to the remote tariff databases and/or apparatus for providing the updated tariff information to a user who provides the updated tariff information to his remote tariff database.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
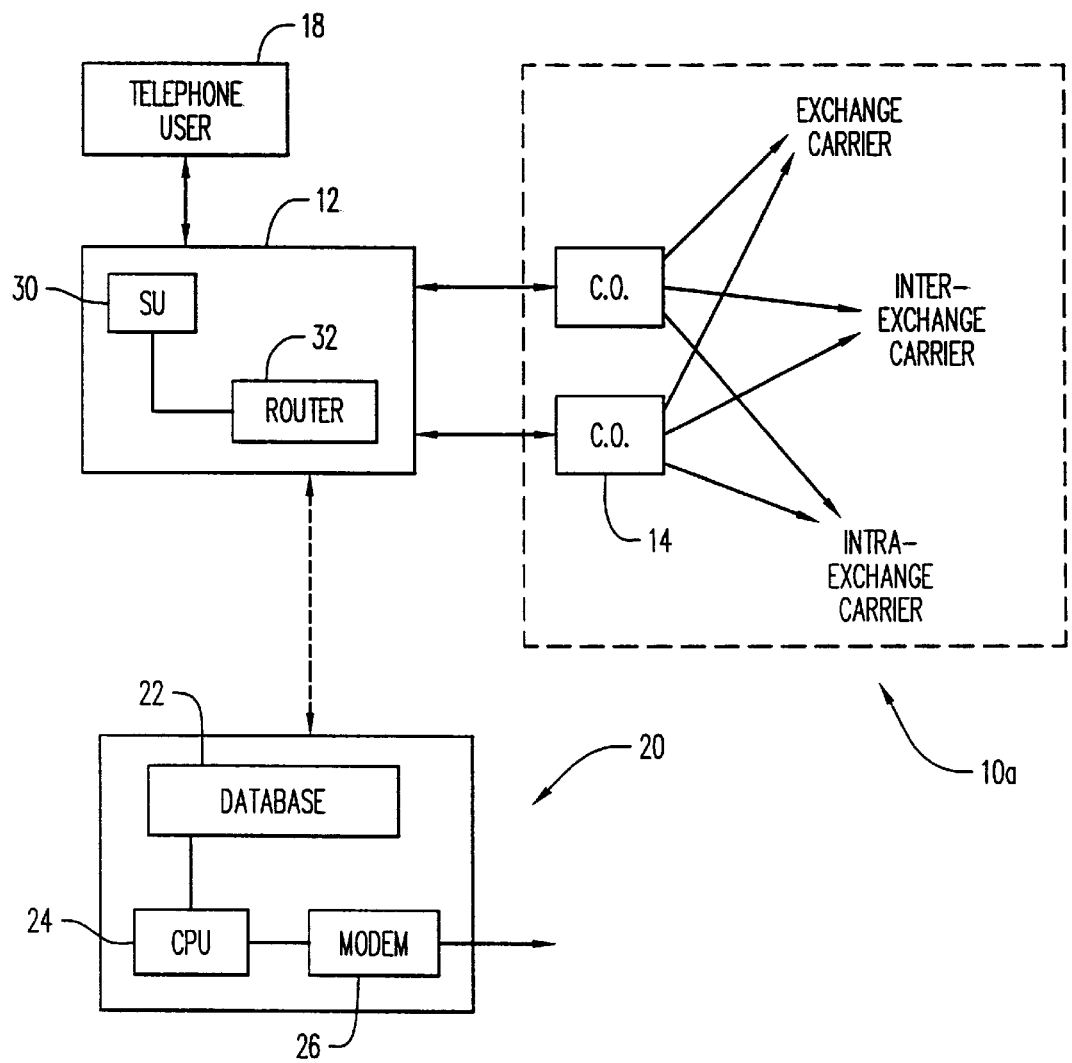
FIG. 1 is block diagram illustration of the least cost router updating system constructed and operative in accordance with a preferred embodiment of the present invention.

Reference is made to FIG. 1, which is a block diagram illustration of the least cost router updating system constructed and operative in accordance with a preferred embodiment of the present invention. FIG. 1 illustrates a simplified version of telephone communication system, generally designated 10, comprising a single telephone dialing unit 12 in communication with a central switching office (denoted C.O.) 14 of one of a plurality of telephone service providers. The telephone dialing unit 12 can also communicate with other central switching offices 14 as desired.

The least cost router updating system comprises a data server, generally designated 20, which comprises a database 22. The information in database 22 is updated by a data server operator whenever a change is made in any of the published rates of a telephone service provider, such as an exchange carrier or a central switching office. The updated information is converted into a suitable format for onward transmission and communicated, by data server 20, to telephone dialing unit 12.

The information stored in database 22 includes, inter alia, all available tariff data from the multiplicity of service providers, both inter and intra-exchange carriers and others, serving the telephone communication system 10. Intra-exchange carriers are carriers operating within a single Local Area Transport Area (LATA). If the dialing system operates with more than one central switching office, the tariffs for the different central switching offices are also stored. The information may be stored in any convenient format, known in the art, such as a look-up table or a database.

Data server 20 further comprises a central processing unit (CPU) 24 and a modem 26 or other similar apparatus for communicating via telephone lines or via any other data communication network. Central processing unit 24, which may be any commercially available processor, controls the operation of data server 20. Modem 26 is used to transfer updated data directly to dialing unit 12. Alternatively, modem 26 can transfer updated data to a third party, such as an electronic mail (E-mail) address from where it may be collected by dialing unit 12 or by an operator.

Telephone dialing unit 12 comprises a dialing unit, such as a tone or pulse dialer, a modem or an ISDN dialing unit, and also comprises a storage unit (SU) 30 and a router (or route selector) 32. Storage unit (SU) 30 is any storage medium, known in the art, which can be used, inter alia, for storing the provider and tariff information received from data server 20. Storage unit 30 may also be used to store any other relevant data, such as special negotiated discounts and call accounting data, which may be needed by the router to calculate the optimum least cost route (LCR) for telephone calls. Router 32 can be any routing unit, known in the art, which recognizes the dialing information input by the call originator and, in accordance with pre-defined parameters, calculates the LCR and consequently reroutes the call. Router 32 can also include routing features as described hereinbelow.

Whenever telephone user (or subscriber) 18 originates a call, router 32 intercepts the digits of the dialed number and processes the calling information. Router 32 then accesses storage unit 30, calculates the least cost routing (LCR) data to ascertain the optimum route for the call, adds any necessary access and authorization codes, and then passes the resulting route selection data to dialing unit 12. Dialing unit 12 then initiates the call to the central switching office (denoted C.O.) 14 which routes the call in accordance with the route selection data signals sent by dialing 12. If there are more than one C.O., the dialing unit 12 also physically switches the connection to the selected C.O. 14.

In order for the telephone user 18 to obtain the maximum benefit from the plurality of constantly changing tariff rates, he needs to maintain an accurate and updated database in storage unit 30. Whenever a change in any of the tariffs is made by any of the providers or central switching offices, the information stored in database 22 is updated by the data server operator. An updated file is then sent by modem 26 to storage unit 30, either directly or preferably via an E-mail address. Alternatively, a diskette containing the updated information can be loaded directly by the telephone user 18 into the storage unit 30, as is known in the art.

Figure 2:
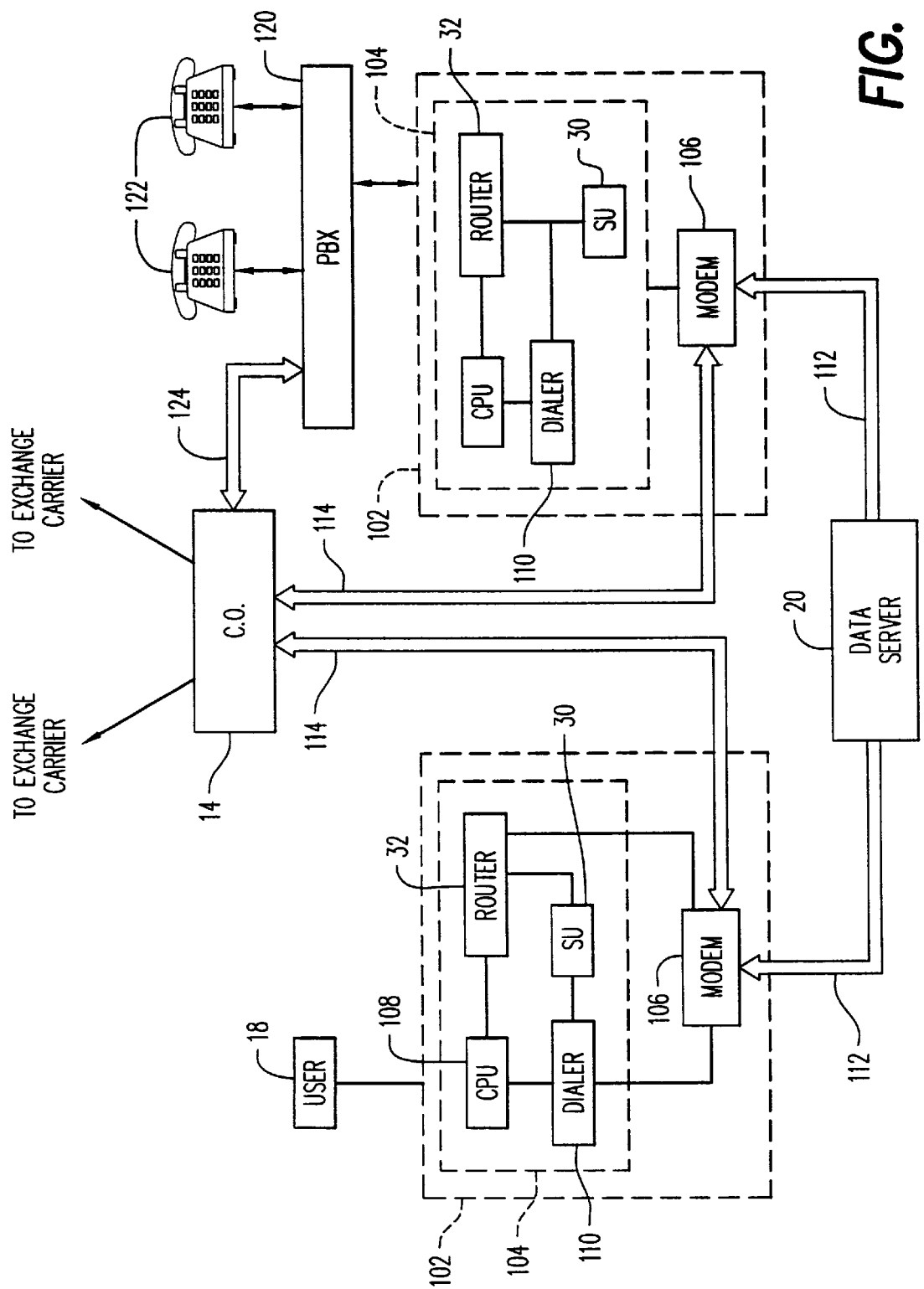
FIG. 2 is a block diagram illustration of the relation of the data server to a plurality of telephone dialing units of the preferred embodiment of the present invention.

Reference is now made to FIG. 2 which is a block diagram illustrating the relation of data server 20 to a plurality of telephone dialing units 12. For simplicity, each telephone dialing unit 12 is shown communicating with only one C.O. 14. Embodiments having similar elements have similar reference numerals throughout.

In a first embodiment, telephone dialing unit 102 comprises a computer, such as a personal computer (PC) 104 connected to a modem 106. PC 104 and modem 106 are of types commercially available. PC 104 comprises a central processing (CPU) 108 which controls the operation of the PC 104 and optionally a built-in dialer 110. Modem 106 is used to receive data from data server 20 (double line 112) and to connect dialing unit 102 to C.O. 14 (double line 114). Modem 106 maybe a dial-up modem which can alternatively be used to directly dial the CO 14, without the need for a separate dialer. PC 104 further comprises the storage unit 30 and router 32, described hereinabove. Built-in dialer 110 is, for example, any commercially available computer based communications program incorporating dialing facilities.

To make a call, the user uses a user interface, such as a keyboard, a mouse, etc., to initiate the call and dial the number. Router 32 intercepts the digits of the dialed number, processes the calling information and accesses storage unit 30, processes the LCR data and selects the optimum route for the call. The call is then dialed by modem 106 in accordance with the optimum routing information ascertained and correspondingly rerouted via the C.O. 14.

In a second embodiment, telephone dialing unit 102, which is similar to the first embodiment, described hereinabove, is also connected to a telephone communications system serving a plurality of stations, such as a Centrex (or CTX) or private branch exchange (PBX) 120, having a plurality of telephone 122 connected thereto. The PBX 120 does not have any least cost routing capabilities.

In this embodiment, the caller may initiate the call by using the built-in dialer 110 to dial the number, as described hereinabove with respect to the first embodiment. In this case, the call is dialed out via the PBX 120 (double line 124). Person who are not connected to a PC having the relevant LCR data may dial out via the PBX 120 (double line 124).

In a further embodiment, PBX 120 is connected directly to PC 104. The PBX 120 can be configured to intercept dialing by telephones 122 and access the storage unit 30 and router 32 of PC 104 to extract the optimum LCR information and reroute the calls.

Whenever the PBX 120, which is connected to PC 104, receives a call, the PBX 120 accesses the storage unit 30 containing the LCR data. Router 32 processes the call data and selects the optimum route for the call and then PBX 120 dials this optimum route.

It will be appreciated that the router 32 can be implemented as part of the telephone dialing unit 102, as part of the PBX 120 or between the PBX 120 and the central switching office 14. No matter where the router 32 is implemented, it provides routing for the call initiated by the telephone 122. If the PBX 120 has routing abilities, and the router 32 operates after the PBX 120, the router 32 can change the routing decisions of the PBX 120. This is especially useful if the router of the PBX 120 has a difficult interface and therefore, is not updated often. The user will still receive the least cost route since the router 32 is updated frequently by the data server 20.

The data server 20 can communicate with any or all of the systems described hereinabove. Whenever it has update tariff information, it sends the updated information to all of the systems with which it communicates. The data server 20 can also update the tariff information within a prior art router by emulating the operator which has to enter the tariff information.

It will be appreciated that the router 32 can also be operated in conjunction with a cellular or wireless telephone. As in the previous embodiments, router 32 can be embedded in such a cellular or wireless telephones or it can be formed as a separate unit.

Finally, it is noted that, in accordance with the present invention, the telephone service providers with which the router 32 operates can be any types of service providers, including but not limited to: inter-exchange carriers, intra-exchange carriers, fax-store-and-forward providers, call-back service providers and local central switching offices. For fax-store-and-forward and call-back service providers, the router 32 or some other portion of the dialing system manages the protocol by which such providers operate.

Figure 3:
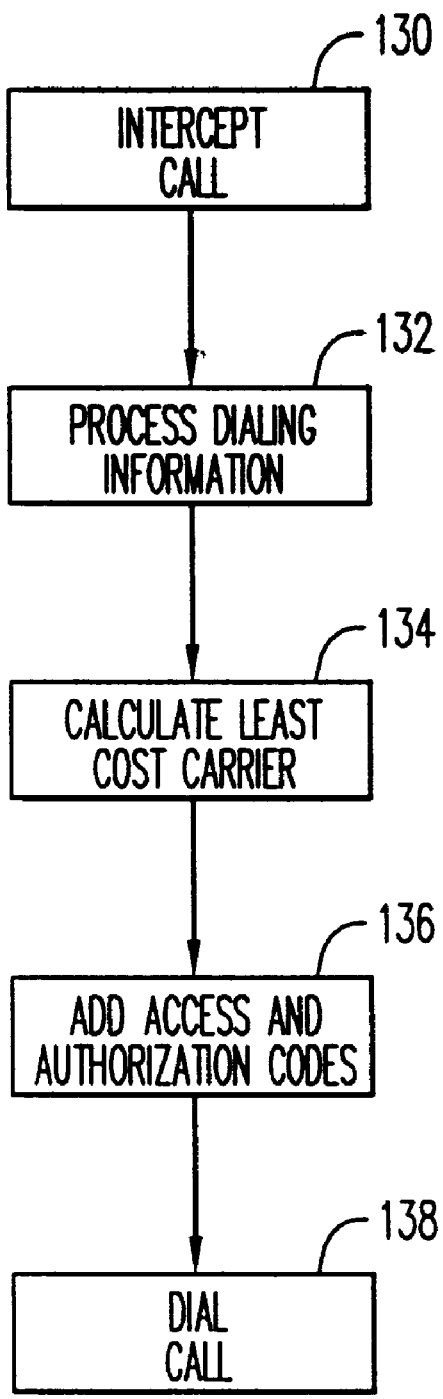
FIG. 3 is a flow chart of the method of real time call routing using the least cost router updating system of the present invention.
Figure 4:
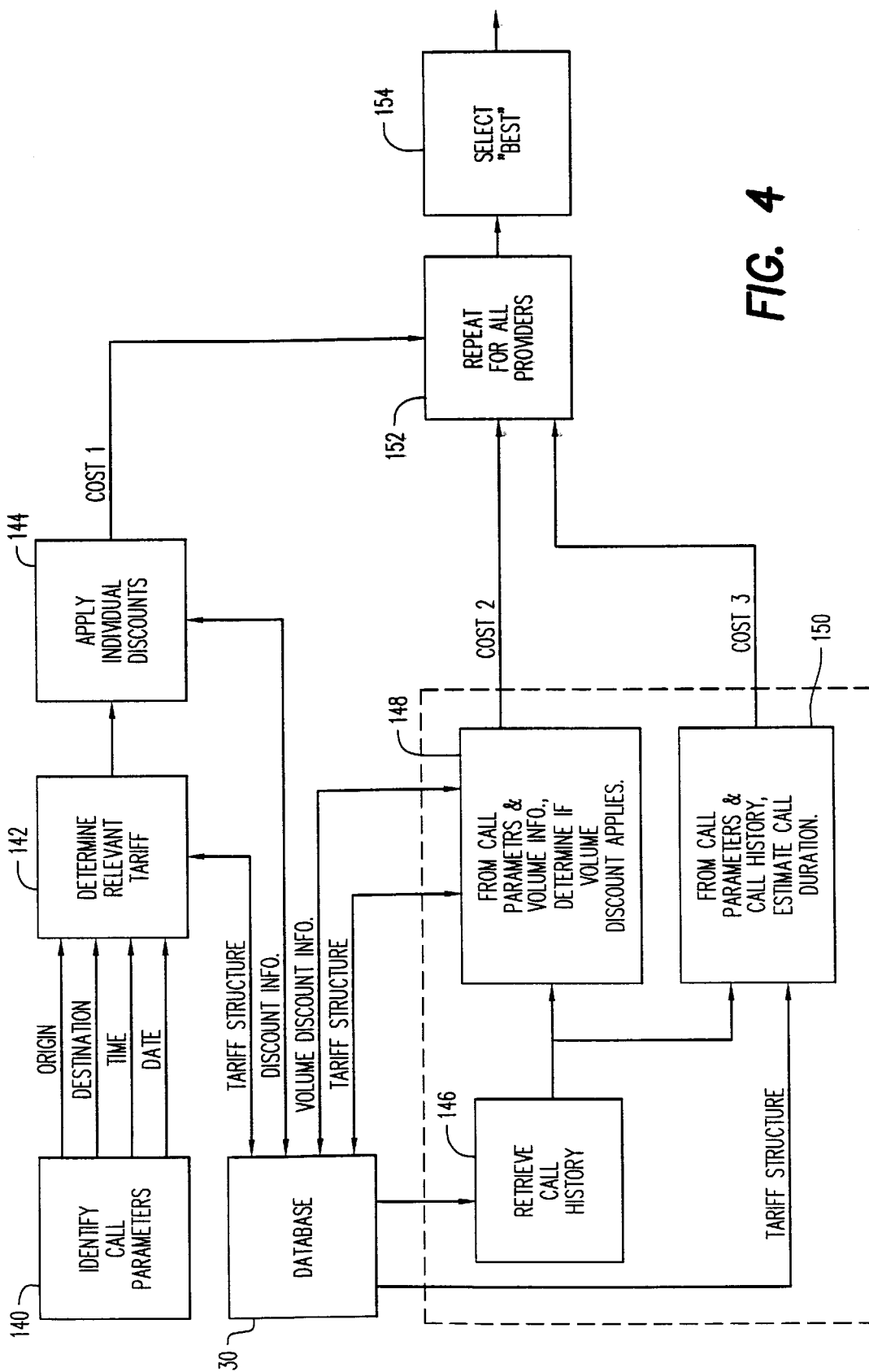
FIG. 4 is a detailed flow chart illustration of the step of processing the dialing information.

Reference is now made to FIGS. 3 and 4. FIG. 3 is a flow chart illustration of a method of real time optimum routing of a telephone call, using the least cost router updating system of the present invention. FIG. 4 is a detailed flow chart illustration of the step of processing the dialing information.

When a call is initiated, router 32 intercepts the call (step 130) and processes the dialing information (step 132). The router then processes the dialing information, as described hereinbelow, and calculates, from all the relevant calling and provider charging data, which provider is preferred in order to obtain the least cost route (step 134). Having selected the provider, any necessary access and authorization codes are added to the dialing parameters (step 136) and the call re-dialed using the adjusted parameters (step 138).

The step of processing the dialing information is detailed in FIG. 4. The call parameters, such as data and time of the call together with the originating and destination numbers, are identified (step 140). The storage unit 30 containing the LCR data is accessed and scanned to retrieve charging data for the particular calling parameters identified. The basic cost of the desired call is then determined (step 142).

The storage unit 30 is also scanned to ascertain whether the call initiator is entitled to any special negotiated discounts from one or more providers, and if relevant, the data is retrieved and the relevant discount is applied (step 144). The result is a first value for the cost of the call, per minute.

Optionally, a check can be made to determine whether call accounting data, as is known in the art, is available and if so the relevant data is retrieved (step 146). This data provides a history of the calls made with a particular service provider and is utilized, for example, to determine (step 148) whether or not a volume discount currently applies or whether it is useful to utilize a certain service provider in order to achieve the volume discount. An volume discount cost is produced.

From the call history, statistics of previous call durations can be made. For example, the statistics can be of the call duration per destination phone number, per distance away from the originating phone number or any other statistic. From these statistics, it can be determined if the call is expected to be short or long, in which case, the tariff of one service provider may be better than that of another for the expected length of the call. An expected cost of the call is produced (step 150).

The above steps are repeated (step 152) for all service providers and the "best" service provider (i.e. the one which provides the lowest cost) is selected (step 154). In addition, the information regarding the call (origin, destination, selected provider, and length of call) are stored in the database for later call history use.

Figure 5:
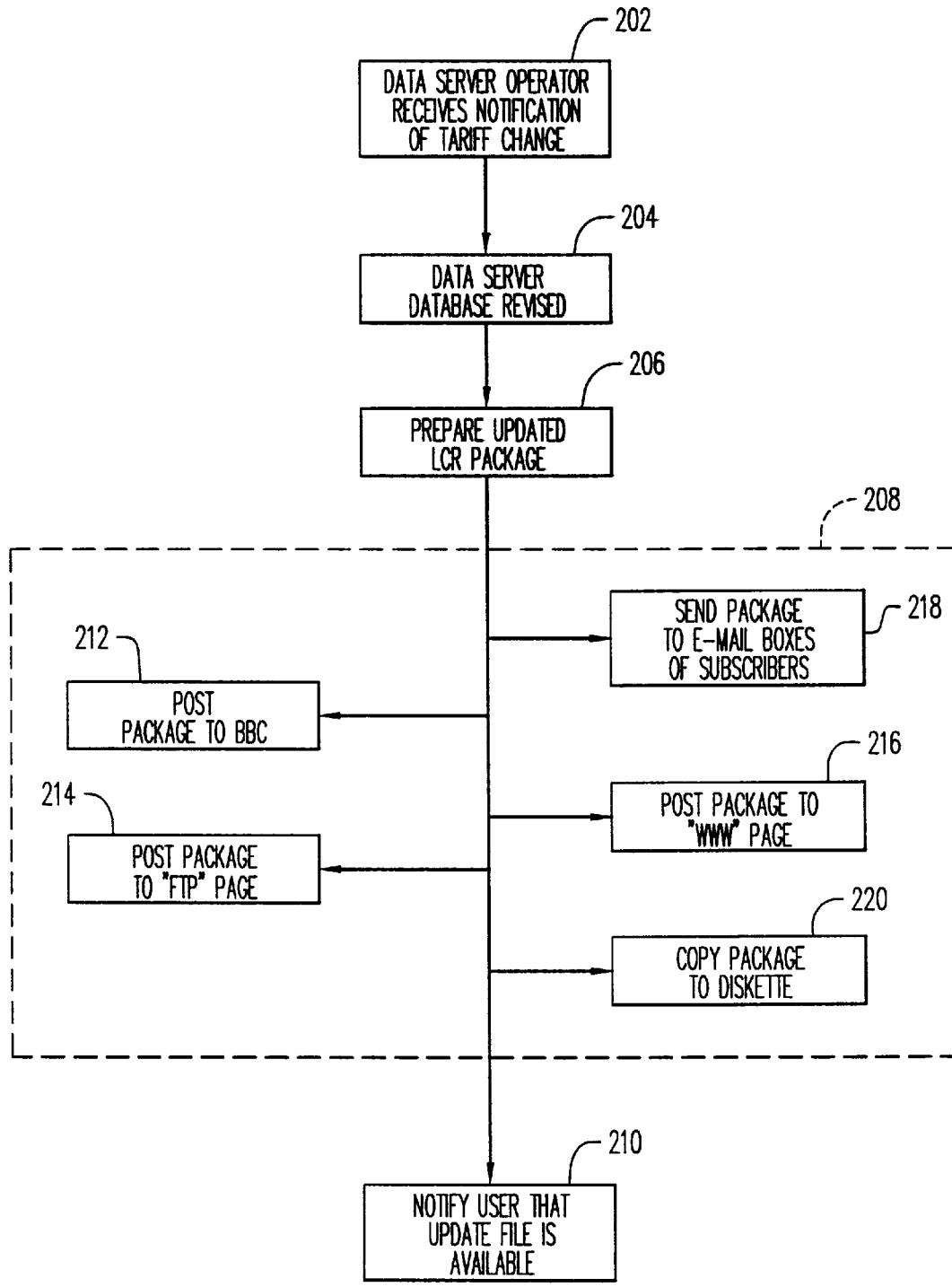
FIG. 5 is a flow chart illustrating the process of updating the storage unit.

Reference is now made to FIG. 5 which is a flow chart diagram illustrating the process of updating the storage unit 30 belonging to telephone user 18.

Whenever the data server 20 receives notification of a change from one of the telephone service providers (step 202), the database 22 is revised (step 204). A package containing the updated LCR information is prepared (step 206), for example in the form of a data file. The data server 20 then posts the updated LCR package to an accessible medium (step 208), shown by dashed lines, and notifies telephone user 18, by any suitable means, that an updated file is available for downloading or collection (step 210).

The accessible medium to which the LCR package may be posted include, for example, any suitable forum accessible by modem. For example, the files can be made available by the data server 20 to subscribers 18 through a bulletin board (212), via file transfer using a file transfer page (ftp)(214) or world wide web (www)(216), or similar, such as are available today through the Internet. The updated package can also be downloaded by data server 20 to the user's E-mail address (218) or copied to a diskette and mailed to the user (220).

To update the routing data stored in storage unit 20, user 18 can retrieve (or upload) the updated file, via his modem 106, from one of the sites (described hereinabove) to which it has been downloaded by data server 20. The updated data is then stored in storage unit 30.

It will be appreciated by persons skilled in the art that the present invention is not limited to what has been particularly shown and described hereinabove. Rather the scope of the present invention is defined by the claims which follow:

I claim:

1. A least cost routing device for determining and establishing an optimum route for a telephone call made by a user, said device comprising:

interception means for intercepting digits input by the user;

a storage unit for storing tariff and telephone call related information;

a least cost router for determining said optimum route for the telephone call and caller utilizing said tariff and telephone call related information and expected call cost, said least cost router operative to generate a dialing signal corresponding to a carrier selected for said optimum route; and communication means, responsive to the combination of said dialing signal and said digits input by the user for accessing said carrier to route said telephone call.

2. The device according to claim 1 further comprising a data server for maintain a database containing tariff related information on local and long distance carriers said data server operative to periodically update said tariff data held in said storage unit.

3. The device according to claim 1, wherein said least cost router comprises means for generating call history information.

4. The device according to claim 1, wherein said least cost router comprises means for determining whether or not a volume discount or special discount applies to the telephone call.

5. The device according to claim 3, wherein said least cost router comprises means for utilizing said call history information to determine statistics of phone calls, including call duration, to be utilized in determining expected call cost.

6. The device according to claim 1 wherein said communication means is formed as part of any one of the following: a centrex exchange (CTX), a private branch exchange (PBX), a cellular telephone and a personal computer.

7. The device according to claim 1, wherein said least cost router comprises means for determining whether or not a volume discount applies to the telephone call.

8. A method for determining and establishing an optimum route for a telephone call by a user, said method comprising the steps of:

storing tariff and telephone call related information within a database;

obtaining from the user, digits making up a telephone number for said telephone call;

determining said optimum route for the telephone call utilizing said tariff and telephone call and caller related information and expected call cost;

generating a dialing signal corresponding to a carrier selected for said optimum route; and accessing said carrier selected for said optimum route by use of a combination of said dialing signal and said telephone number input by the user to enable completion of said telephone call.

9. The method according to claim 8, wherein said determining step employs call history information to derive expected call cost.

10. The method according to claim 8, wherein said determining step determines whether or not a volume discount or a special discount applies to the telephone, call to derive expected call cost.

11. The method according to claim 8, wherein said determining step utilizes said call history information to determine statistics of phone calls including call duration to be utilized in determining expected call cost.

12. The method according to claim 8, wherein said determining step determines whether or not a volume or volume aggregation discount applies to the telephone call in determining expected call cost.

* * * * *